United States Patent [19]

Linwood et al.

[11] Patent Number: 4,906,853
[45] Date of Patent: Mar. 6, 1990

[54] APPARATUS AND METHOD FOR VARYING THE TIMING OF A CONTROL SIGNAL

[75] Inventors: Gary Linwood; Wayne Duncan, both of Newark, Del.

[73] Assignee: United Manufacturing Co., Inc., New Castle, Del.

[21] Appl. No.: 169,382

[22] Filed: Mar. 17, 1988

[51] Int. Cl.$^4$ .................. G02B 27/00; G01V 9/04
[52] U.S. Cl. .................. 250/551; 250/221; 250/214 AL; 455/617; 340/600
[58] Field of Search .............. 250/214 R, 221, 551, 250/214 RC, 214 AL; 340/555, 539, 600; 455/617, 608, 602, 603, 127, 117, 95, 98; 375/21, 23; 331/66

[56] References Cited

U.S. PATENT DOCUMENTS

| | | | |
|---|---|---|---|
| 3,439,320 | 4/1969 | Ward | 349/213 |
| 3,478,344 | 11/1969 | Schwitzgebel et al. | 128/2 |
| 3,696,384 | 10/1972 | Lester | 340/312 |
| 3,739,329 | 6/1973 | Lester | 340/312 |
| 3,875,527 | 4/1975 | Garcia | 331/66 |
| 4,032,777 | 6/1977 | McCaleb | 250/221 |
| 4,151,407 | 4/1979 | McBride et al. | 250/199 |
| 4,160,246 | 7/1979 | Martin et al. | 340/539 |
| 4,183,019 | 1/1980 | Lekhtman | 340/539 |
| 4,275,385 | 6/1981 | White | 340/312 |
| 4,442,426 | 4/1984 | Heuschmann et al. | 455/608 |
| 4,594,580 | 6/1986 | Nelson | 340/539 |
| 4,601,064 | 7/1986 | Shipley | 455/608 |
| 4,731,870 | 3/1988 | Black et al. | 455/127 |
| 4,756,025 | 7/1988 | Munz et al. | 455/608 |

Primary Examiner—David C. Nelms
Assistant Examiner—Michael Messinger
Attorney, Agent, or Firm—Woodcock Washburn Kurtz Mackiewicz & Norris

[57] ABSTRACT

A system has individual infrared radiation transmitter assemblies which issue characteristics and coded identifying signals in infrared radiation, so that transmission and identification of a plurality of distinctively characteristic signals is accomplished by varying the timing of various periodic transmissions so as to avoid interference among the plurality of transmissions. A receiver assembly receives and decodes binary numbered codes sent from a plurality of the individual pocket-size transmitters for keeping track of the location of the transmitters within an area monitored by the receiver assembly. Each transmitter assembly has a timer which periodically variably issues electrical pulses within a predetermined time cycle. The timer actuates a clock oscillator to cause a code stored memory to be read out as coded electrical signals representing binary information and a light emitting diode converts the coded electrical signals into infrared radiation pulses representing the same binary information.

9 Claims, 2 Drawing Sheets

APPARATUS AND METHOD FOR VARYING THE TIMING OF A CONTROL SIGNAL

This invention relates to a means for varying the control of a transmission of binary signals.

More particularly, it applies to controlling a uniquely coded transmitted signal which identifies the sending transmitter in distinction from similar devices, which may be within a common area and transmitting to a common receiver.

BACKGROUND OF THE INVENTION

Proximity monitoring systems for persons or objects have been provided which comprise a transmitter and receiver for position reporting. These systems have deficiencies in an inability to process a plurality of signals from multiple units in a limited area, particularly in a short time span. With substantially simultaneous multiple transmissions to a common receiver collisions occur which hinder or defeat the desired identification of the transmitters.

The actuating means which trigger the transmission of identifying signals from these transmitters are operated by means which are occasional in nature. For example, various previous systems which transmit a coded RF signal are actuated by a mechanical-type of operation, such as a switch actuated by a coded card or detection unit such as a peripheral instrusion detector. These triggering means fail to provide a continuous, and regularly present triggering means which is also variable.

It is an object of this invention to provide a system for variably controlling the initiation of a periodic pulse cyclically produced.

More particularly, it is an object to provide for varying the timing of the actuation of sequencing of addresses in a memory into which information can be introduced and later extracted.

Specifically, it is an object to provide a simple transmitter carried by each individual, which issues a characteristic and coded identifying signal upon regularly periodic actuation, so that transmission and identification of a plurality of distinctively characteristic signals within a system of transistors is accomplished by varying the timing of the various periodic transmissions to avoid collisions between receptions at a common receiver.

SUMMARY OF THE INVENTION

This invention provides a variation of start up of a system which operates to cyclically issue a distinct signal in cycles of significantly variable duration and within a finite time period. The inception of the issuance of the signal and the duration of the cycle is varied by the intensity of the incident light on photosensitive component such as a photodiode, that is a variation from dark to light.

Specifically, an identification means is provided for communication from one or more transmitters associated within a system and movably positioned with respect to each other. It is a feature of the present system that multiple transmissions are possible from a plurality of transmitters so that the single system can process the information from several transmitters.

In an embodiment a transmitter has a clock producing pulses which time the sequencing of pulses to a stored memory to produce a characteristic binary number issued for transmission to a receiver. The binary numbers are produced by transition from hi to lo which produce bits. The transition is an on-off phenomenon, like Morse Code.

It is a feature that by this invention a plurality of separately individual and independent transmitters may be programmed to transmit distinctive signals within comparable time cycle and be actuated to initiate the transmission of the signals at different segments within the time cycle as a result of variations in the intensity of incident light on the various individual transmitters.

BRIEF DESCRIPTION OF THE DRAWINGS

The principles and above mentioned advantages and objects of the present invention will be better understood upon reading of the following description together with the accompanying drawings in which.

DEFINITIONS

The following are definitions of terms as used herein;

comparator—a unit that compares two binary numbers telling whether the numbers are equal, one-greater-than-the-other or visa-versa.

counter—a special kind of register made up of flip-flop circuits with one input and usually a output from each flip-flop, which counts pulses arriving at the input and stores the total count in a certain code (usually binary numbers).

clock input—an input terminal on a unit typically used for receiving a timing control-clock signal, but used in some applications for a control signal or even data.

programmable—a circuit which can be set with a fixed program.

cycle—an interval of space or time in which one set of events or phenomena is completed.

code—a set of meanings assigned to groups of bits made up of binary representations or binary states provided by a sequence of high and low voltage areas.

character—symbol used as part of organization, control or representation of data.

binary number—number using base 2 and consisting of the digits 0 and 1.

clock—a circuit that generates a series of evenly spaced pulses and in a microprocessor causes the microprocessor to proceed from one step to the next in executing instructions.

Figure 1:
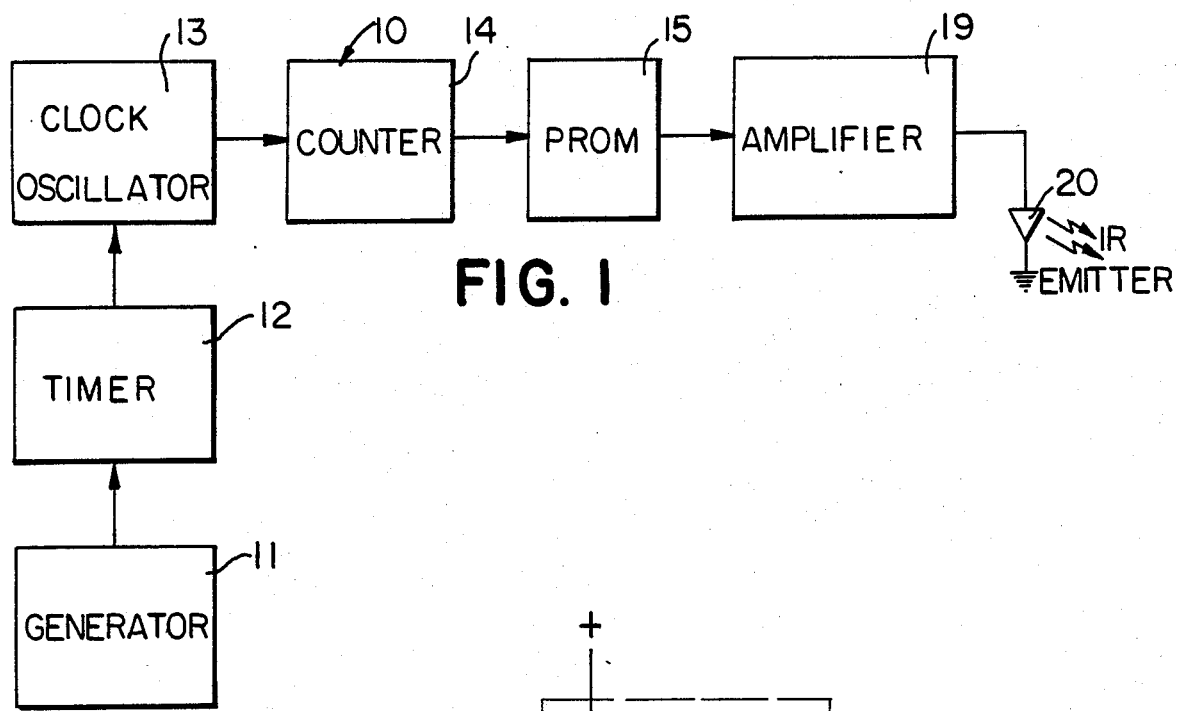
FIG. 1 is a functional block diagram of an independent transmitter according to the present invention.

FIG. 1 illustrates in a block diagram a typical individual independent transmitter assembly 10 for the operation of this invention. In the preferred embodiment this is a pocket-sized device which can be passively carried by individuals. The assembly includes a random time variable generator 11 which provides a signal to a timer 12. The timer 12 initiates an operation of the transmitter assembly and the generator 11 is adapted to affect this initiation. As explained in greater detail below the initiation of the timer 12 is under the control of the generator 11 and the operation of a voltage level provided by light incident on the assembly. The timing of the occurrence of the signal from the generator 11 is proportional to the incident light. Thus the generator introduces a random time variable resulting from the conventional variations in ambient light in the area. The timer 12 periodically creates the cycle of pulses of the assembly by sending out a periodic pulse. The periodic pulse is set to occur at predetermined points in time, such as once every ten seconds, and thus define a cycle. In the present embodiment the timing of the frequency of the pulse can be varied over a range of from once every second to once every 10 seconds with commensurate cycle duration. The timer 12 actuates a clock oscillator 13 in each cycle. The clock oscillator 13 is gated by the pulses from its clock to provide sequencing of the counter 14 associated with a programmable read-only-memory 15, hereinafter referred to as PROM 15. The PROM 15 is programmed with a specific bit pattern which will generate a unique code in a binary number to be transmitted from the assembly 10. The coded word is in the form of a binary number. The binary character is stored in memory by the program in the PROM 15 to identify the individual transmitter assembly. The PROM 15 is provided with means for easily programming into the PROM 15 an individual and unique code for the respective transmitter assembly 10.

The characteristic binary number of the transmitter unique code is read out of the memory by the sequencing of the memory addresses by the counter. The counter 14 and the PROM 15 when energized by the pulses from the clock oscillator 13 progress through the active interval, 30 milliseconds in the preferred embodiment and then shuts off. The cycle continues for the remainder of the 10 second period. This binary number is transmitted to an IR emitter 20 through suitable amplifier 19. The IR emitter 20 which is driven by transistors in the amplifier 19 converts the electrical signals making up the code of the binary numbers into signals of infra-red radiation. This signal emission from the IR emitter 20 is in a wavelength of from 900 to 10,000 nanometers and an illustrative pulsing frequency is 1.2 milliseconds or 833 pulses/second. The binary numbers making up the binary character are formed by changes in state.

Data is transmitted as a fixed-length stream of binary digits (bits) concatenated to form one or more binary characters. Each bit is weighted according to its position within a character in binary fashion. The bit length is defined by the "bit cell" time which is nominally 1200 microseconds. Data is encoded in a so-called bi-phase which is defined as follows:

A binary "1" or "hi" bit is represented by a transition of the signal level from a "0" or low voltage level to a "1" or high voltage level at the nominal center of a bit cell.

A binary "0" or "low" bit is represented by a transition of the signal level from a "1" or high voltage level to a "0" or low voltage level at the nominal center of a bit cell.

The transmitter utilizes an amplitude-shift-keyed modulation technique with a nominal carrier frequency of 38 kilohertz and a data rate of 833 hertz. A logical "0" and a logical "1" are defined by the modulation of the carrier.

In the preferred embodiment, zeroes and ones are transmitted by the radiation from emitter 20 in on-and-off pulses of the infra-red radiation emitting emitter 20.

Figure 2:
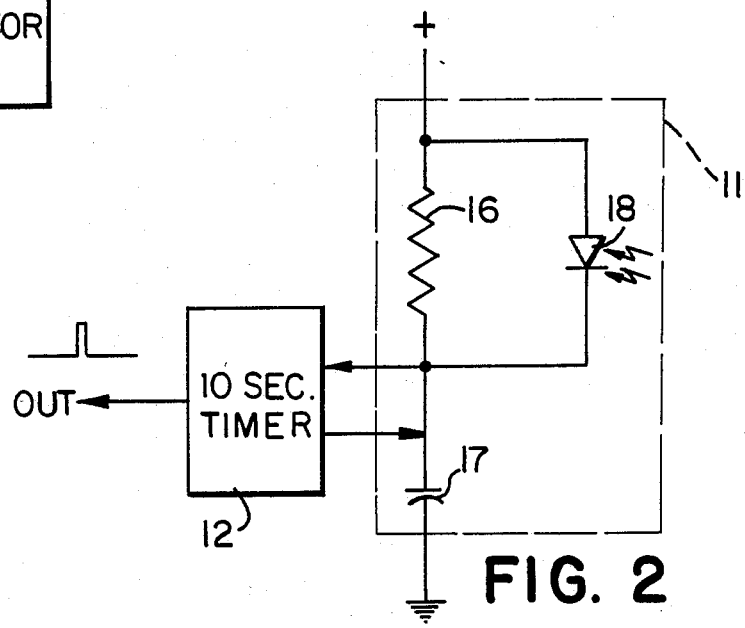
FIG. 2 is a schematic diagram of a circuit in the transmitter providing the triggering impulses initiating the functions of the transmitter.

FIG. 2 illustrates an embodiment of a variable time generator 11 according to this invention. In this embodiment of the means for varying the initiation of the periodic pulse variations in the level of light on a photodiode varies the level of current flowing through the component so that an increase in illumination increases the current and vice versa. In the specific embodiment of the generator 11 described herein and R/C circuit has a resistance 16, a capacitor 17 and a photodiode 18 in parallel across the resistance 16. Upon an increase of current across the photodiode 18 the capacitor is charged to a voltage level at which the timer 12 is actuated to vary the timing of the initiation of the transmission cycle. Thus, the operation of the generator in producing a voltage level which actuates the timer 12 is provided by current from the photodiode 18.

Figure 3:
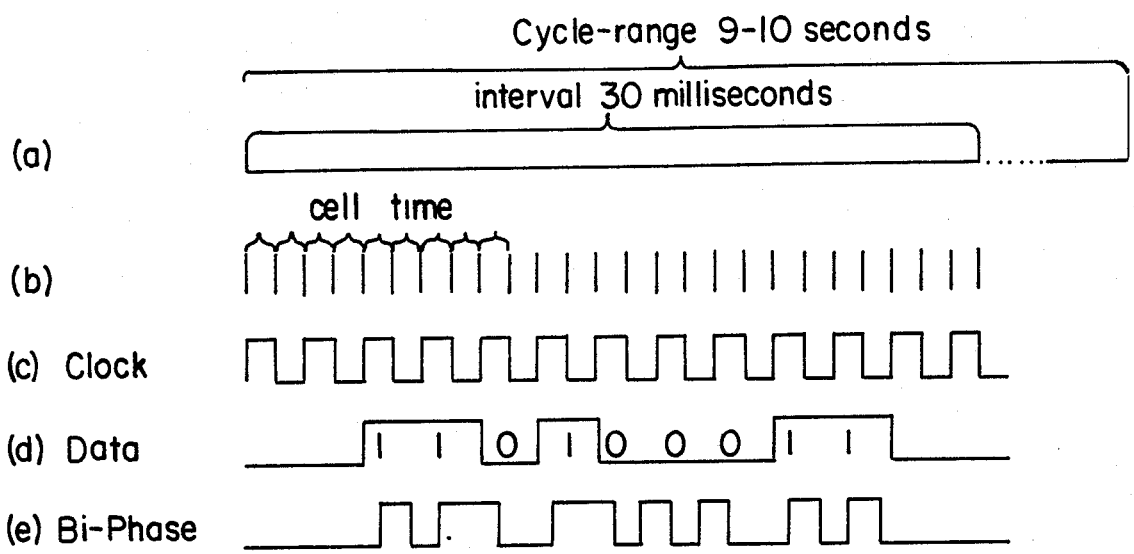
FIG. 3 is a timing diagram with graphs showing the cycle of operation and the transmission intervals of the bi-phase method for data formation and graphs of the relevant functions in this method.

Referring to FIG. 3 this is a diagram charting graphs of the pulses in an active interval in a transmission cycle of the transmitter assembly which occurs upon actuation of the timer 12 by the operation of a voltage level in the variable time generator 11. It will be readily understood that this active interval as described herein is representative of the actuation in any one of a plurality of transmitter assemblies which are coded with similar cycles of transmission of uniquely coded characters to a common receiver, as explained in greater detail below. The active interval makes up the part of recurring transmission cycle. In this active interval the assembly produces and sends coded characters. With the actuation in the generator 11 of an enabling current and a triggering of the transmission cycle and of the active interval, the timer 12 pulses the clock and these clock pulses are delivered to the oscillator 13. The clock pulses span the active interval. The oscillator 13 initiates and sustains a carrier frequency delivered. These clock pulses are delivered from the oscillator 13 to the counter 14 on line 21. In the present embodiment a suitable carrier frequency is 38 Kc. The counter 14 provides an output in the active interval over address lines 22 to the PROM 15.

The signals from the counter 14 sequence the addresses of the PROM 15 to read out the data stored in the addresses by the programming of the PROM 15. A carrier frequency is provided in the PROM 15 for providing the data carrying bits. Each pulse from counter 14 is related to modulation of the carrier frequency. As noted above, the data in ones and zeroes is encoded by transitions. The data in the addresses is written out by transitions of signal levels from hi to lo or vice versa.

Figure 4:
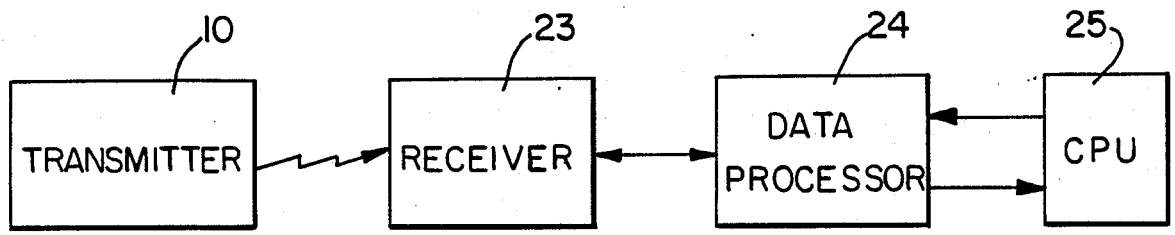
FIG. 4 is a functional block diagram of a system embodying a transmitter of this invention.

This radiation is received by a receiver assembly 23 shown in FIG. 4, and thru a data processor 24. The receiver 23 contains a central processing unit, not shown and identified hereinafter as CPU delivered to computer 25. The program in the CPU of receiver 23 decodes the binary numbered code and validates the code by comparison with information stored in the computer 25 memory.

The receiver assembly 23 by operation of the program in the computer 25 receives, synchronizes and decodes the transmitted data from each of the transmitter assemblies 10 in the designated area. The decoded data is relayed to the data processor. The data is stored in memory in the central computer 25 until software routines call for the data to be utilized in subsequent operations.

The receiver 23 detects infra-red signals within a receiver band pass for the radiation, and the CPU in the receiver 23 converts the encoded bit stream to a binary non-return-to zero bit stream and also provides a synchronizing clock signal.

In the timing diagram of FIG. 3, the uppermost graph (a) illustrates the cycle of transmission and the active interval within the cycle. The cycle is represented as 10 seconds in length and the active interval 30 milliseconds. The next graph (b) illustrates the individual cell times of 1.2 milliseconds each. Thus in the embodiment the 30 millisecond active interval is made up of 25 cells, which define the bit lengths. The cell times represent the timing in the formulating and transmission of the binary characters.

The graph (c) represents the train of clock pulses which as the diagram of FIG. 3 shows are synchronized with the cell times. Accordingly, in the embodiment of this detailed description the active interval has 13 pulse separated by 12 spacing interims to equal the 25 cell times of the illustrated active interval. Graph (d) illustrates the bits representing a binary character consisting a string of ones and zeroes. Graph (e) illustrates in a graphic manner the charge states of the circuitry in the PROM 15 in accordance with the coded bi-phase data which in turn provide the binary code of the binary characters illustrated in graph (d). The vertical lines carrying arrows represent transitions of signal level. The horizontal lines represent states of voltage level. The upward pointing arrows signify a transition from low voltage level to high voltage level and the downward pointing arrows vice versa; correspondingly the upper horizontal lines in the cell times represent "ones" or "1" and the lower horizontal lines in a cell times represent "zeroes" or "0". The transitions are peculiar to the coded characteristic binary number of the individual transmitter assembly 10. They are produced by the data read out of the PROM 15 addresses as the counter 14 sequences the data containing addresses in the PROM 15. Thus it is seen that the coded data programmed into the PROM 15 of an individual transmitter assembly 10 is read out to make up the characteristic coded binary numbers of the individual assembly 10. As described above, these signals suitably amplified are sent out form IR emitter for reception and detection, as in the receiver 23.

Figure 5:
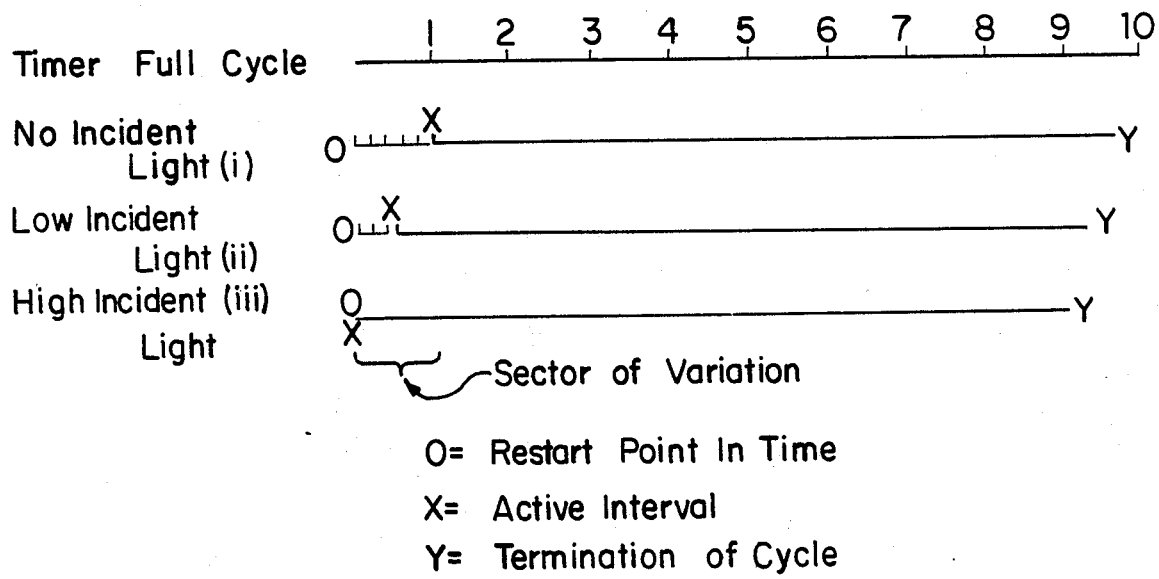
FIG. 5 is a chart illustrating the relationship between an active interval of signal transmission and a cycle of the system.

This reading out and sending of the IR radiation occurs during the active interval illustrated in graph (a) of FIG. 3. Thus transmission occupies a minor sector of the transmission cycle. The relative greater length of the time of the cycle accomodates variations of the timing of the active interval within the cycle. FIG. 5 is a chart illustrating this shifting of the active interval within the overall transmission cycle as related to the intensity of light incident on the variable time generator 11.

According to the present embodiment the timer 12 is adjusted to run for 9 seconds after actuation. The timer 12 is designed to be actuated by a voltage charge from the capacitor 17 during the first second of each 10 second cycle. At the end of the first second the time enabling pulse to clock oscillator 13 is automatically generated within the timer 12.

In FIG. 5 the bar (i) represents the plotted against time transmission cycle when there is no light incident on the generator 11. The cycle starts at the symbol 0 but the timer 12 does not issue the enabling pulse to clock oscillator until the end of the first second. The bar (ii) represents the transmission cycle with low intensity light on the generator 11. The charging of the generator 11 causes the timer 12 to issue the enabling pulse after about ½ second. The bar (iii) represents the transmission cycle with high intensity light on the generator 11.

The variable time generator 11 produces an analog signal with a value change in the time of voltage build-up proportional to variations of the intensity of the incident light on the photosensitive element of the generator 11. The incident light is generally intrinsic to or derived from the particular area in which the particular transmitter is located but can as well be the result of some specified light source. According to this invention normal or conventional variations in light intensity within a defined area are adequate to result in value changes in the timing of the analog signal. In the preferred embodiment, this is a change in the period of voltage build-up. The analog signal is converted to a pulse which enables a digital operation of the PROM 15. After the conversion takes place the transmission of the characteristic binary number is obtained.

It will be understood that while the preferred embodiment described herein uses a change in analog voltage to determine the timing of the signal from the incident light, other analog means responding to variations in light within a given area may be employed for determining the timing of the analog signal.

From the foregoing, various advantages will be seen. For example, a random time variable is provided to the transmittal of the preselected code. The transmitter can transmit one of several codes in a cycle of once every few seconds, a 1 to 10 range in this embodiment. The random time variable, in causing the active interval vary some small amount in the cycle, for example 0.1 second, randomizes the transmission and makes the transmission from the individual and independent transmitter distinctive.

With respect to the embodiments of the invention described herein, it should be understood that where not shown power supplies are provided having the correct polarities and magnitudes for supplying electrical energy for operating the described circuitry.

Various modification or additions may be made to the embodiments described hereinabove according to the invention without departing from the scope as defined by the accompanying claims.

What is claimed is:

1. A control apparatus for triggering a periodic pulse at random times
    said apparatus comprising
    a timer for variably issuing a periodic pulse in a defined time cycle,
    a signal generator for variably generating within the defined cycle an output voltage,
    said generator having a light sensitive component for varying in time the generation of said output voltage in proportion to the intensity of visible light incident on said light sensitive component,
    and means for applying said generated output voltage to said timer for triggering the issuance of the periodic pulses.

2. A control apparatus as claimed in claim 1 wherein an R-C circuit coupled to a photodiode provides the output voltage.

3. Transmission apparatus for transmitting signals in electromagnetic radiation
    comprising a timer for cyclically issuing electrical pulses connected to an oscillator for porviding said electrical pulses to said oscillator within a predetermined time period wherein the time of inception and duration of the pulses is variable, a light sensitive component for varying in time the generation of an output voltage in proportion to the intensity of visible light incident on the light sensitive component, and means for applying said generated output voltage to said timer varying the triggering the issuance of said electrical pulses to said oscillator within said predetermined time period in accordance with said output voltage, a read-only-memory means for storing a code in binary, means associated with said oscillator for providing a train of clock pulses actuated by said electrical pulse and adapted to sequence a counter in said read-only-memory, said counter sequencing addresses of said memory for supplying said stored code in coded electrical signals modulated on a carrier frequency to read out the data stored in the addresses, an emitter for converting said coded electrical signals representing the binary information into coded electromagnetic radiation pulses representing the same binary information.

4. Transmission apparatus as claimed in claim 3 wherein the predetermined time period is in the range of one to ten seconds.

5. Transmission apparatus as claimed in claim 3 wherein the electromagnetic radiation is infra red radiation.

6. Transmission apparatus as claimed in claim 3 wherein said timer issues a periodic pulse within the predetermined time period and connecting means apply the generated output voltage to said timer for triggering the issuance of the periodic pulse.

7. Transmission apparatus as claimed in claim 6 wherein an R-C circuit coupled to a photodiode in the photosensitive means provides the output voltage.

8. Transmission apparatus as claimed in claim 3 wherein said sequencing of addresses occurs in an interval of 30 milliseconds within said predetermined time period.

9. The method of providing variable timing in the transmission of electromagnetic radiation from an individually independent transmitter of electromagnetic radiation, said method comprising the steps of:

generating the output voltage from a photosensitive circuit variable in time in proportion to the intensity of light incident on the photosensitive circuit, periodically triggering an electrical pulse from a pulse issuing timer within a predetermined time period with the output voltage of the photosensitive circuit through a connection between the photosensitive circuit and the timer actuating an oscillator with said electrical pulses, producing a train of clock from said oscillator, sequencing addresses in which a code in binary is stored in a read-only memory upon applying said train of clock pulses to said read-only memory to supply binary information in coded electrical signals, transmitting said coded electrical signals representing binary information to one or more emitting diodes, and converting said coded electrical signals representing the binary information into coded electromagnetic radiation pulses representing the said binary information.

* * * * *